US009205404B2

(12) United States Patent
Kwon et al.

(10) Patent No.: US 9,205,404 B2
(45) Date of Patent: Dec. 8, 2015

(54) CARBON DIOXIDE ADSORBENTS AND PRODUCTION METHODS THEREOF, CARBON DIOXIDE CAPTURE MODULES INCLUDING THE SAME, AND METHODS FOR SEPARATING CARBON DIOXIDE USING THE SAME

(71) Applicant: Samsung Electronics Co., Ltd., Suwon-Si, Gyeonggi-Do (KR)

(72) Inventors: Soon Chul Kwon, Hwaseong-si (KR); Hyuk Jae Kwon, Suwon-si (KR); Hyun Chul Lee, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/247,612

(22) Filed: Apr. 8, 2014

(65) Prior Publication Data
US 2014/0305302 A1 Oct. 16, 2014

(30) Foreign Application Priority Data

Apr. 15, 2013 (KR) .......................... 10-2013-0041230

(51) Int. Cl.
*B01D 53/02* (2006.01)
*B01J 20/04* (2006.01)

(52) U.S. Cl.
CPC .............. *B01J 20/048* (2013.01); *B01D 53/02* (2013.01); *B01D 2253/1124* (2013.01); *B01D 2257/504* (2013.01); *Y02C 10/08* (2013.01)

(58) Field of Classification Search
CPC ................. B01D 2253/1124; B01D 2257/504; B01D 53/02; B01J 20/048; Y02C 10/08
See application file for complete search history.

(56) References Cited

U.S. PATENT DOCUMENTS

| 6,346,140 | B2 * | 2/2002 | Miyazawa et al. ............. 95/139 |
| 6,387,845 | B1 | 5/2002 | Masahiro et al. |
| 7,517,512 | B2 | 4/2009 | Corriu et al. |
| 2001/0042440 | A1 * | 11/2001 | Miyazawa et al. ............. 95/139 |
| 2004/0060444 | A1 * | 4/2004 | Smith et al. ..................... 96/108 |
| 2005/0019240 | A1 * | 1/2005 | Lu et al. ........................ 423/210 |
| 2005/0120877 | A1 | 6/2005 | Wu et al. |
| 2007/0003477 | A1 * | 1/2007 | Haik-Beraud et al. ........ 423/650 |
| 2008/0152561 | A1 | 6/2008 | Corriu et al. |
| 2011/0067426 | A1 * | 3/2011 | Hwang et al. ................... 62/271 |
| 2012/0121904 | A1 | 5/2012 | Serre et al. |

FOREIGN PATENT DOCUMENTS

| JP | 08-034607 A | 2/1996 |
| JP | 2006-205023 A | 8/2006 |
| JP | 2009-073924 A | 4/2009 |

(Continued)

OTHER PUBLICATIONS

Meis, et al., "On the Influence and Role of Alkali Metals on Supported and Unsupported Activated Hydrotalcites for $CO_2$ Sorption", Ind. Eng. Chem. Res. (2010), 49, pp. 8086-8093.

(Continued)

*Primary Examiner* — Christopher P Jones
(74) *Attorney, Agent, or Firm* — Harness, Dickey & Pierce, P.L.C.

(57) ABSTRACT

An adsorbent for carbon dioxide may include a mesoporous inorganic oxide having a crystalline halide of an alkali metal or alkaline earth metal supported thereto and a chemical species containing phosphorous (P), sulfur(S), or boron (B) supported thereto.

20 Claims, 5 Drawing Sheets

(56) References Cited

FOREIGN PATENT DOCUMENTS

| | | |
|---|---|---|
| JP | 2010-174172 A | 8/2010 |
| JP | 2012-518032 A | 8/2012 |
| KR | 2006-0079589 A | 7/2006 |
| KR | 2012-0007882 A | 1/2012 |

OTHER PUBLICATIONS

Lee, et al., "Development of new alumina-modified sorbents for $CO_2$ sorption and regeneration at temperatures below 200°C", ScienceDirect: Fuel 90 (2011) pp. 1465-1470.

Othman, et al., "Elevated temperature carbon dioxide capture via reinforced metal hydrotalcite", Microporous and Mesoporous Materials 138 (2011) pp. 110-117.

Ding, et al., "High Temperature Recovery of $CO_2$ From Flue Gases Using Hydrotalcite Adsorbent", Trans IChemE, vol. 79, Part B, Jan. 2001, pp. 45-51.

Kim, et al., "Sucrose-derived graphitic porous carbon replicated by mesoporous silica", Korean J. Chem. Eng., 23(6), pp. 1063-1066 (2006).

\* cited by examiner

CARBON DIOXIDE ADSORBENTS AND PRODUCTION METHODS THEREOF, CARBON DIOXIDE CAPTURE MODULES INCLUDING THE SAME, AND METHODS FOR SEPARATING CARBON DIOXIDE USING THE SAME

CROSS-REFERENCE TO RELATED APPLICATION

This application claims priority under 35 U.S.C. §119 to Korean Patent Application No. 10-2013-0041230, filed in the Korean Intellectual Property Office on Apr. 15, 2013, the entire contents of which are incorporated herein by reference.

BACKGROUND

1. Field

Example embodiments herein relate to a carbon dioxide adsorbent including a mesoporous inorganic oxide, a method of preparing the same, a capture module for carbon dioxide including the same, and a method of separating carbon dioxide using the same.

2. Description of the Related Art

A considerable increase in the concentration of global atmospheric $CO_2$, one of the greenhouse gases, has raised concern about climate change and has led to increasing efforts in research and development on control of $CO_2$ emissions. The main $CO_2$ emission sources include fossil fuel-based power plants, vehicles, and manufacturing plants for cement, limestone, hydrogen, ammonia, and the like. Capture and separation of carbon dioxide from fixed facilities such as various power plants or factories are considered as first measures for the control of $CO_2$ emissions. The capture of carbon dioxide refers to a process of physically or chemically separating $CO_2$ from a gas mixture exhausted from chemical reactions or combustion of fossil fuels. For capturing $CO_2$ by adsorption, carbon materials, zeolites, and metal-organic framework (MOF) materials are used, but they show a certain level of adsorption efficiency only at a relatively low temperature below about 200° C., and thus are not suitable for being used in $CO_2$ adsorption at a relatively high temperature. Among fixed $CO_2$-emission facilities, a considerable amount of carbon dioxide are emitted from fossil fuel-based power plants (e.g., an integrated gasification combined cycle (IGCC) system or a thermoelectric power plant) and natural gas wells. The carbon dioxide adsorbent for such facilities should be able to adsorb carbon dioxide at a relatively high temperature, for example, about 200° C. to 550° C. When carbon dioxide is adsorbed to the adsorbent, a carbonate bond may form, which may entail consuming a greater amount of energy for desorption.

SUMMARY

Some example embodiments relate to a carbon dioxide adsorbent that has an improved adsorption capacity, that is applicable at a relatively high temperature range, and that may be readily regenerated.

Some example embodiments relate to a method of producing the carbon dioxide adsorbent.

Some example embodiments relate to a carbon dioxide capturing module including the carbon dioxide adsorbent Some example embodiments relate to a method of separating carbon dioxide that includes bringing a gas mixture containing carbon into a contact with the carbon dioxide adsorbent.

An adsorbent for carbon dioxide may include a mesoporous inorganic oxide having a crystalline halide of an alkali metal or alkaline earth metal supported thereto and a chemical species containing phosphorous (P), sulfur (S), or boron (B) supported thereto.

The mesoporous inorganic oxide may have an average pore diameter of about 1 nm to about 50 nm and a pore volume of about 0.1 $cm^3/g$ to about 1.5 $cm^3/g$.

The mesoporous inorganic oxide may include silica, alumina, titania, zirconia, tin oxide, cobalt oxide, zinc oxide, indium oxide, nickel oxide, hafnium oxide, vanadium oxide, or a combination thereof.

The mesoporous inorganic oxide may be an amorphous material.

The mesoporous inorganic oxide may be synthesized in the presence of an acid compound and a self-assembled template.

The halide of the alkali metal or alkaline earth metal may be selected from a lithium halide, a sodium halide, a potassium halide, a rubidium halide, a cesium halide, a magnesium halide, a calcium halide, a strontium halide, a barium halide, and a combination thereof.

The chemical species containing phosphorous, sulfur, or boron may be an oxide of phosphorous, an oxide of sulfur, an oxide of boron, a phosphate, a borate, a sulfate, or a combination thereof.

The halide of the alkali metal or alkaline earth metal may be supported to the mesoporous inorganic oxide in an amount of about 0.01 to 0.5 moles based on 1 mole of an element of the inorganic oxide. The chemical species containing phosphorous, sulfur, or boron may be supported to the mesoporous inorganic oxide in an amount of about 0.01 to 2 moles based on 1 mole of an element of the inorganic oxide. As used herein, the term "an element of the inorganic oxide" refers to an element other than oxygen (for example, Si for silica, $SiO_2$).

A mole ratio between the halide of the alkali metal or alkaline earth metal and the chemical species containing phosphorous, sulfur, or boron may range from about 1:0.03 to about 1:20.

A method of preparing a carbon dioxide adsorbent including a mesoporous inorganic oxide having a crystalline halide of an alkali metal or alkaline earth metal supported thereto and a chemical species containing phosphorous, sulfur, or boron supported thereto may include obtaining an acidic aqueous solution including a surfactant; contacting the acidic aqueous solution with an inorganic oxide precursor and a precursor of a halide of an alkali metal or alkaline earth metal to form a gel and optionally aging the gel at a temperature of 30° C. or higher; and performing a first process or a second process. The first process may include mixing the gel with a precursor of a chemical species containing phosphorous, sulfur, or boron to form a mixture, stirring the mixture and optionally aging the mixture at a temperature of at least about 30° C. to form a product, and separating, optionally drying, and calcining the product. The second process may include separating, optionally drying, and calcining the gel, preparing an aqueous solution of a precursor of a chemical species containing phosphorous, sulfur, or boron, impregnating a calcined product with the aqueous solution of the precursor of the chemical species containing phosphorous, sulfur, or boron, and optionally hydrothermally-treating the same, separating an impregnated and optionally hydrothermally-treated product, and recalcining a separated product.

The acidic aqueous solution may be prepared by dissolving an inorganic acid, an organic acid, or a salt thereof in water.

The surfactant may be an ionic surfactant, a non-ionic surfactant, or a combination thereof.

The inorganic oxide precursor may be selected from triethoxy silane, trimethoxy silane, tributoxy silane, titanium isopropoxide, titanium butoxide, titanium oxysulfate, titanium boride, titanium chloride, titanium nitride, tin butoxide, aluminum chloride, zinc chloride, indium chloride, zirconium chloride, nickel chloride, hafnium chloride, vanadium chloride, silicon carbide, silicon tetrachloride, silicon nitride, silicon tetraacetate, silicon tetrafluoride, silicon tetrabromide, silicon hexaboride, tetraallyl orthosilicate, tetramethyl orthosilicate, tetraethyl orthosilicate, tetrapropyl orthosilicate, and a combination thereof.

The precursor of the halide of the alkali metal or alkaline earth metal may include an alkali metal or alkaline earth metal selected from Li, Na, K, Rb, Cs, Mg, Ca, St, and Ba, and may be a halide, a hydroxide, a nitrate, an acetate, a hydrate thereof, or a combination thereof.

The precursor of the chemical species containing phosphorous, sulfur or boron may be selected from $KH_2PO_4$, $K_2HPO_4$, $CaHPO_4$, $(NH_4)H_2PO_4$, $(NH_4)_2HPO_4$, $NaH_2PO_4$, $Na_2HPO_4$, $KH_2BO_3$, $K_2HBO_3$, $CaHBO_3$, $(NH_4)H_2BO_3$, $(NH_4)_2HBO_3$, $NaH_2BO_3$, $Na_2HBO_3$; $K_2SO_4$, $KHSO_4$, $CaSO_4$, $(NH_4)_2SO_4$, $(NH_4)HSO_4$, $Na_2SO_4$, $NaHSO_4$, $K_2S_2O_8$, $(NH_4)_2S_2O_8$, and $Na_2S_2O_8$.

The hydrothermal treating may be conducted under a pressure of about 1 bar to about 10 bar at a temperature of about 80° C. to about 200° C. The calcination or the recalcination may be carried out in an oxygen-containing atmosphere at a temperature of about 200° C. to about 700° C.

A carbon dioxide capture module may include a carbon dioxide adsorbent that includes a mesoporous inorganic oxide having a crystalline halide of an alkali metal or alkaline earth metal supported thereto and a chemical species containing phosphorous, sulfur, or boron supported thereto.

A method of separating carbon dioxide may include bringing a gas mixture containing carbon dioxide into contact with a carbon dioxide adsorbent that includes a mesoporous inorganic oxide having a crystalline halide of an alkali metal or alkaline earth metal supported thereto and a chemical species containing phosphorous, sulfur, or boron supported thereto.

The method of separating carbon dioxide may further include heat-treating the carbon dioxide adsorbent at a temperature of about 30° C. to about 500° C., optionally under a reduced pressure, to desorb carbon dioxide.

The mesoporous inorganic oxide may be an amorphous material, and may have an average pore diameter of about 1 nm to about 50 nm and a pore volume of about 0.1 cm$^3$/g to about 1.5 cm$^3$/g.

The gas mixture may further include at least one gas selected from hydrogen, nitrogen, and methane.

The gas mixture may be brought into contact with the carbon dioxide adsorbent at a temperature of about 30° C. to about 500° C.

The carbon dioxide adsorbent may adsorb carbon dioxide with improved efficiency even at a relatively high temperature, the adsorbed carbon dioxide may be desorbed therefrom with relative ease, and the carbon dioxide adsorbent may have improved thermal durability at a temperature of 200° C. or higher.

DETAILED DESCRIPTION

Figure 1:
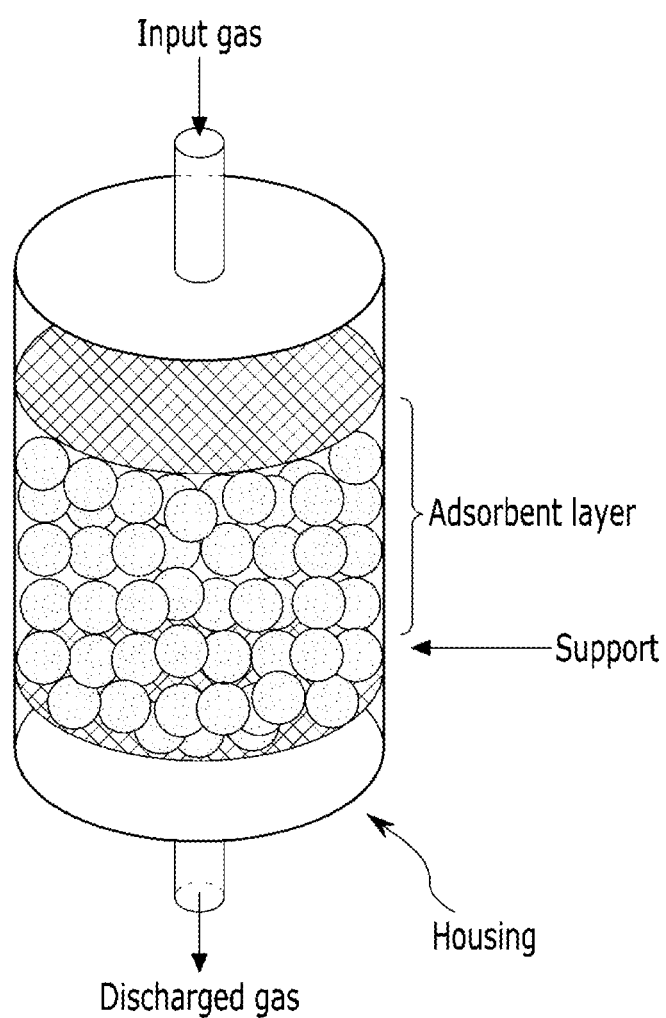
FIG. 1 is a schematic view showing a carbon dioxide adsorbent module according to one example embodiment.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

As used herein, the term "supporting" refers to affixing a substance to be supported to a support, for example, by means of hydrothermal treatment, impregnation, and/or calcination.

As used therein, the term "the surface of the mesoporous inorganic oxide" may include the outer surface of the structure and the inner surface of the pores included in the structure.

As used herein, the term "input gas stream" refers to a gas stream prior to passing through an adsorbent region or prior to initial contact with an adsorbent.

In an example embodiment, a carbon dioxide adsorbent may include a mesoporous inorganic oxide having a crystalline halide of an alkali metal or alkaline earth metal supported thereto and a chemical species containing phosphorous, sulfur, or boron supported thereto.

The mesoporous inorganic oxide includes a plurality of mesopores, and the average diameter of the pores may range from about 1 to 30 nm, about 1 to 20 nm, or about 1.2 nm to 10 nm. The inorganic oxide may have a pore volume ranging from 0.1 $cm^3/g$ to about 3 $cm^3/g$, about 0.2 $cm^3/g$ to about 1.5 $cm^3/g$, or about 0.2 $cm^3/g$ to about 1.0 $cm^3/g$. In such a range, it is possible to accomplish a higher level of adsorption capacity. The inorganic oxide may be prepared by a sol-gel method. The inorganic oxide may include an amorphous material. The mesoporous inorganic oxide may include many pores having a relatively uniform size and being arranged regularly. The mesoporous inorganic oxide may include silica, alumina, titania, zirconia, tin oxide, cobalt oxide, zinc oxide, indium oxide, nickel oxide, hafnium oxide, vanadium oxide, or a combination thereof.

Because the mesoporous inorganic oxide may include a plurality of mesopores as mentioned above, it has a relatively large specific surface area. Therefore, it may provide a relatively large surface area for the halide of the alkali metal or alkaline earth metal to be supported, and may present a relatively large number of adsorption sites for carbon dioxide. The carbon dioxide adsorbent including the mesoporous inorganic oxide may therefore exhibit a relatively high level of adsorption capacity and may be useful both in the pre-combustion adsorption and the post-combustion adsorption. In particular, it may exhibit a relatively high level of adsorption efficiency even at a relatively high temperature (e.g., a middle range temperature of about 150° C. to about 550° C.) so that the adsorption may proceed without any process for lowering the temperature of the hot exhausted gas to ambient temperature (e.g., about 23° C. to 25° C.).

In the carbon dioxide adsorbent, the mesoporous inorganic oxide includes the halide of the alkali metal or alkaline earth metal being supported on the surface thereof (e.g., exterior surface as well as interior surface defining the pores). Examples of the halide of the alkali metal or alkaline earth metal may include a lithium halide (e.g., LiCl), a sodium halide (e.g., NaCl), a potassium halide (e.g., KCl), a rubidium halide (e.g., RbCl), a cesium halide (e.g., CsCl), a magnesium halide (e.g., $MgCl_2$), a calcium halide (e.g., $CaCl_2$), a strontium halide (e.g., $SrCl_2$), a barium halide (e.g., $BaCl_2$), and the like. For example, the halide of the alkali metal or alkaline earth metal may be LiCl, NaCl, KCl, RbCl, CsCl, $MgCl_2$, $CaCl_2$, $SrCl_2$, $BaCl_2$, or a combination thereof. The amount of the halide of the alkali metal or alkaline earth metal is not particularly limited, but it may be included in about 0.01 to about 0.5 moles of alkali metal or alkaline earth metal, for example about 0.05 to about 0.3 moles of alkali metal or alkaline earth metal, based on 1 mole of the element of the inorganic oxide.

Conventional adsorbents uptake carbon dioxide exhausted from the combustion via a chemical adsorption process, wherein the alkali metal oxide and carbon dioxide undergo an acid-base reaction to form a carbonate ($CO_3$), and carbon dioxide captured by such a process may require a relatively high energy input for its desorption. By contrast, in the carbon dioxide adsorbent including the mesoporous inorganic oxide, the halide of the alkali metal or alkaline earth metal being supported thereto may adsorb carbon dioxide without any formation of the carbonate. Therefore, it may exhibit a relatively high level of adsorption efficiency while the desorption of carbon dioxide as adsorbed may be achieved at a lower temperature so that the regeneration of the adsorbent requires a lower energy amount.

In the carbon dioxide adsorbent, a chemical species containing phosphorous, sulfur, or boron may be supported to or on the surface of the mesoporous inorganic oxide (e.g., exterior surface as well as interior surface defining the pores). The chemical species may include an oxide, a salt, or a combination thereof. The chemical species may be formed by calcining the precursor of the chemical species together with the mesoporous inorganic oxide and the halide of the alkali metal or alkaline earth metal (or a precursor thereof) at an oxygen-containing environment. The chemical species containing phosphorous, sulfur, or boron is supported to or on the surface of the mesoporous inorganic oxide and thereby enhances the adsorption capacity of the resulting carbon dioxide adsorbent. Without wishing to be bound by any theory, it is believed that the chemical species containing phosphorous, sulfur, or boron may increase the electro-negativity of the surface of the structure and thus enhance the surface affinity to carbon dioxide, resulting in the improved adsorption capacity for carbon dioxide.

The amount of the chemical species containing phosphorous, sulfur, or boron as supported to the mesoporous inorganic oxide is not particularly limited, and it may range about 0.01 to 2 moles, about 0.05 to 1.5 moles, about 0.08 to 1.4 moles. Within such a range, the adsorption efficiency may further increase. The ratio of phosphorous, sulfur, or boron to the alkali metal or alkaline earth metal is not particularly limited, but it may range from about 0.03 to 20, for example from about 0.1 to 12 based on the mole of each element. Within such a range, the chemical species containing phosphorous, sulfur, or boron may enhance the surface activity of the adsorbent and thus increase the surface affinity to carbon dioxide.

In an example embodiment, a method of producing a carbon dioxide adsorbent is provided, the carbon dioxide adsorbent including a mesoporous inorganic oxide having a crystalline halide of an alkali metal or alkaline earth metal supported thereto and a chemical species containing phosphorous, sulfur, or boron supported thereto. The method may include obtaining an acidic aqueous solution including a surfactant; contacting the acidic aqueous solution with an inorganic oxide precursor and a precursor of a halide of an alkali metal or alkaline earth metal to form a gel and optionally aging the gel at a temperature of 30° C. or higher; mixing the gel with a precursor of a chemical species containing phosphorous, sulfur, or boron to form a mixture, stirring the mixture, and optionally aging the mixture at a temperature of about 30° C. or higher to form a product; and separating, optionally drying, and calcining the product.

The acidic aqueous solution including a surfactant may be prepared by dissolving an inorganic acid, an organic acid, or a salt thereof in water to form a solution and adding a surfactant thereto. Examples of the inorganic acid may include hydrochloric acid (HCl), nitric acid ($HNO_3$), sulfuric acid ($H_2SO_4$), tartaric acid ($C_4H_6O_6$), sulfamic acid ($H_3NSO_3$), and the like. Examples of the organic acid may include acetic acid ($CH_3COOH$), citric acid ($C_6H_8O_7$), and the like. In an example, HCl may be used so as to form an inorganic oxide structure with proper sized pores and to act as a halogen atom source for the halide of the alkali metal or alkaline earth metal. The acidic aqueous solution may have pH ranging from about 1 to about 4. The surfactant is added to the acidic aqueous solution to form a micelle, which may become a template for the formation of the mesoporous inorganic oxide. The surfactant may determine the pore size and arrangement thereof in the mesoporous inorganic oxide structure. The surfactant may be selected from an ionic surfactant, a non-ionic surfactant, and a combination thereof.

The ionic surfactant may be selected from sodium dodecyl sulfate, sodium dodecyl benzene sulfonate, octyl trimethyl ammonium bromide (OTAB), decyl trimethyl ammonium bromide (DeTAB), dodecyl trimethyl ammonium bromide (DTAB), cetyl trimethyl ammonium bromide (CTAB), and a combination thereof.

The non-ionic surfactant may include an amphiphilic block copolymer. Examples of the amphiphilic block copolymer may include Pluronic P123 ($HO(CH_2CH_2O)_{20}(CH_2CH(CH_3)O)_{70}(CH_2CH_2O)_{20}H$ made by BASF), and a polyoxyethylene ether, for example, polyoxyethylene lauryl ether, polyoxyethylene cetyl ether, polyoxyethylene oleyl ether, polyoxyethylene stearyl ether, and the like.

The surfactant may be used in an amount of about 0.01 moles to about 3 moles, for example, about 0.1 mole to about 2.5 moles based on 1 mole of the inorganic oxide precursor. When the surfactant is used within such a range, a micelle (e.g., a template) may be formed with relative ease.

Then, an inorganic oxide precursor and a precursor of the halide of the alkali metal or alkaline earth metal are added to the acidic aqueous solution to form a gel. The addition of the precursor may be made under stirring. In this stage, the precursor of the inorganic oxide may be added first and hydrated prior to the addition of the precursor of the halide of the alkali metal or alkaline earth metal. The inorganic acid precursor may undergo a condensation reaction in the acidic aqueous solution to form a mesoporous structure. The temperature and the time for the gel formation are not particularly limited, but may be chosen appropriately. For example, the gel formation may occur at a temperature of about 35° C. or higher for about 2 hours to about 5 hours. The gel formation may occur while stirring.

If desired, the gel thus formed may be subjected to aging. The time and the temperature for the aging are not particularly limited, and may be chosen appropriately. For example, the aging may be conducted at a temperature of about 40° C. to about 120° C. for about 12 hours to about 24 hours. The gel thus formed may be separated in a suitable manner.

The inorganic oxide precursor may include an element selected from silicon, titanium, tin, aluminum, zinc, indium, zirconium, nickel, hafnium, and vanadium, and it may be an alkoxide, a halide, a boride, an oxysulfate, a nitride, or a carbide. Examples of the inorganic oxide precursor may include triethoxy silane, trimethoxy silane, tributoxy silane, titanium isopropoxide, titanium butoxide, titanium oxysulfate, titanium boride, titanium chloride, titanium nitride, tin butoxide, aluminum chloride, zinc chloride, indium chloride, zirconium chloride, nickel chloride, hafnium chloride, vanadium chloride, silicon carbide, silicon tetrachloride, silicon nitride, silicon tetraacetate, silicon tetrafluoride, silicon tetrabromide, silicon hexaboride, tetraallyl orthosilicate, tetramethyl orthosilicate, tetraethyl orthosilicate, tetrapropyl orthosilicate, and a combination thereof.

The precursor of the halide of the alkali metal or alkaline earth metal may be a halide, a hydroxide, a nitrate, an acetate, or a hydrate thereof including an alkali metal or alkaline earth metal selected from Li, Na, K, Rb, Cs, Mg, Ca, St, and Ba. When the acidic aqueous solution does not include any source for the halogen element (for example, the acidic aqueous solution is prepared by using nitric acid or acetic acid), the halide of the alkali metal or alkaline earth metal may be used as the precursor. Examples of the precursor of the halide of the alkali metal or alkaline earth metal may include lithium chloride, sodium chloride, potassium chloride, rubidium chloride, cesium chloride, magnesium chloride, calcium chloride, strontium chloride, barium chloride, lithium hydroxide, sodium hydroxide, potassium hydroxide, rubidium hydroxide, cesium hydroxide, magnesium hydroxide, calcium hydroxide, strontium hydroxide, barium hydroxide, lithium nitrate, sodium nitrate, potassium nitrate, rubidium nitrate, magnesium nitrate hexahydrate, calcium nitrate tetrahydrate, calcium nitrate hydrate, barium nitrate, strontium nitrate, and a mixture thereof. The amount of the precursor of the halide of alkali metal or alkaline earth metal is not particularly limited and is appropriately chosen in light of the amount of the halide of alkali metal or alkaline earth metal intended to be supported to the inorganic oxide. For example, the precursor of the halide of alkali metal or alkaline earth metal may be added in such an amount that about 0.01 to 0.5 moles of the alkali metal or alkaline earth metal is supported thereto based on one mole of the element of the inorganic oxide.

The gel thus obtained is mixed with the precursor of the chemical species containing phosphorous, sulfur, or boron to prepare a mixture, which is then stirred, and optionally aged at a temperature of about 30° C. or higher, to produce a product. Examples of the precursor of the chemical species containing phosphorous, sulfur, or boron may include, but are not limited to, $KH_2PO_4$, $K_2HPO_4$, $CaHPO_4$, $(NH_4)H_2PO_4$, $(NH_4)_2HPO_4$, $NaH_2PO_4$, $Na_2HPO_4$, $KH_2BO_3$, $K_2HBO_3$, $CaHBO_3$, $(NH_4)H_2BO_3$, $(NH_4)_2HBO_3$, $NaH_2BO_3$, $Na_2HBO_3$, $K_2SO_4$, $KHSO_4$, $CaSO_4$, $(NH_4)_2SO_4$, $(NH_4)HSO_4$, $Na_2SO_4$, $NaHSO_4$, $K_2S_2O_8$, $(NH_4)_2S_2O_8$, $Na_2S_2O_8$, KCl, $CaCl_2$, $NH_4Cl$, NaCl, $KClO_4$, $NH_4ClO_4$, $NaClO_4$, KF, $KHF_2$, $CaF_2$, $NH_4F$, $NH_4HF_2$, NaF, and $NaHF_2$. The amount of the chemical species containing phosphorous, sulfur, or boron is not particularly limited, and may be appropriately selected in light of the amount the chemical species intended to be supported to the inorganic oxide. For example, the precursor of the chemical species containing phosphorous, sulfur, or boron may be added in such an amount that about 0.01 to 2 moles of phosphorous, sulfur, or boron is supported thereto based on one mole of the element of the inorganic oxide. In a non-limiting example, the precursor of the chemical species may be added in an amount of greater than or equal to about 0.1 moles, for example, about 0.5 mole to 3 moles, with respect to one mole of the precursor of the inorganic oxide.

The temperature and the time for the aging are not particularly limited, and may be appropriately chosen. For example, the aging may be conducted at a temperature of about 30° C. to about 150° C., for example, about 40° C. to 120° C. for about one hour or longer. The aging may be carried out at least twice at different temperatures for a predetermined time. For example, first aging may be conducted at a temperature of less than or equal to about 50° C. (e.g., about 40° C.) for one hour or longer (e.g., for about 10 hours or longer), and second aging may be conducted at a temperature of greater than about 50° C. (e.g., about 80° C. or higher) for one hour or longer (e.g., for about 10 hours or longer).

After the addition of the precursor of the chemical species containing phosphorous, sulfur, or boron, the product prepared by the stirring and (optionally) the aging is separated, dried if desired, and then calcined. The drying conditions are not particularly limited and may be appropriately chosen. For example, the drying may be carried out at a temperature of less than or equal to about 80° C., for example less than or equal to about 50° C. (about 24° C.) for about 12 hours or longer, for example about 18 hours to about 10 days. The separated (and optionally dried) product is calcined. The conditions for the calcination are not particularly limited and may be appropriately chosen. For example, the calcination may be carried out at a temperature ranging from about 400° C. to about 700° C., for example about 450° C. to about 600° C., for about 2 hours to about 7 hours.

After the calcination, the mesoporous inorganic oxide structure thus obtained may have a controlled size and distribution of pores, and the crystalline halide of alkali metal or alkaline earth metal and the chemical species of phosphorous, sulfur, or boron are supported to the surface of the structure. The $CO_2$ adsorbent including such a structure has a unique structure of the amorphous mesoporous oxide and the crystalline halide of the alkali (and/or alkaline earth) metal. In addition, the halide of the alkali metal or alkaline earth metal (e.g., KCl) and the chemical species containing phosphorous, sulfur, or boron are relatively uniformly distributed in the amorphous structure including many mesopores having a predetermined regularity in terms of the size and the arrangement of the pores. Such a structure may present many basic adsorption sites for carbon dioxide and thus exhibit improved adsorption capacity even at a relatively high temperature. Moreover, such adsorption sites for carbon dioxide do not follow the conventional mechanism, leading to the formation of the carbonate and thus the desorption of adsorbed $CO_2$ may be accomplished at a lower temperature, allowing more stable regeneration of the adsorbent.

In another example embodiment, a method of preparing the adsorbent for carbon dioxide may include obtaining an acidic aqueous solution including a surfactant; contacting the acidic aqueous solution with an inorganic oxide precursor and a precursor of a halide of an alkali metal or alkaline earth metal to form a gel and optionally aging the gel at a temperature of 30° C. or higher; separating, optionally drying, and calcining the gel to obtain a calcined product; preparing an aqueous solution of a precursor of a chemical species containing phosphorous, sulfur, or boron; impregnating the calcined product with the aqueous solution of a precursor of a chemical species containing phosphorous, sulfur, or boron and optionally hydrothermally-treating the same; separating an impregnated and optionally hydrothermally-treated product; and recalcining the separated product.

The preparation of the acidic aqueous solution including the surfactant, the precursor of the inorganic oxide, the precursor of the halide of the alkali metal or alkaline earth metal, the gel formation, and the aging thereof, and the precursor of the chemical species of phosphorous, sulfur, or boron, may be the same as set forth above.

When the precursor of the inorganic oxide and the precursor of the alkali metal or alkaline earth metal halide are added to the acidic aqueous solution, the gel is formed, and the gel thus formed is optionally aged, and then separated and calcined. The separated gel may be subjected to drying, if desired. The conditions for the drying and the calcination may be the same as set forth above.

The product as obtained from the calcination (i.e., the calcined product) is impregnated with the aqueous solution of the precursor of the chemical species containing phosphorus, sulfur, or boron. The impregnation may include mixing the calcined product with the aqueous solution of the precursor of the chemical species containing phosphorus, sulfur, or boron and stirring the resulting mixture. The aqueous solution of the precursor of the chemical species containing phosphorus, sulfur, or boron may be prepared by dissolving a predetermined amount of the precursor of the chemical species in water. The concentration of the aqueous solution is not particularly limited, and may be appropriately adjusted in light of the amount of the chemical species intended to be supported to the inorganic oxide. In a non-limiting example, the solution may have a concentration of about 0.01 to 10 M, for example about 0.1 to 8 M. The temperature and the time of the impregnation are not particularly limited, and may be appropriately chosen. For example, the impregnation may be carried out at a temperature of about 25° C. to about 100° C. for about 1 hour to about 12 hours.

The calcined product being impregnated may be subjected to a hydrothermal treatment, if desired. The hydrothermal treatment may be conducted by heat-treating the calcined product in the aqueous solution of the precursor of the chemical species containing phosphorus, sulfur, or boron. The temperature and the time for the heat-treatment are not particularly limited, and may be chosen appropriately. For example, the heat-treatment may be carried out at a temperature of about 80° C. to about 200° C. for about 12 hours to about 24 hours.

The product being impregnated and optionally hydro-thermally treated is separated and dried if desired, and then recalcined. The conditions and the time for the recalcination may be the same as set forth above regarding the calcination.

After the recalcination, a carbon dioxide adsorbent including the mesoporous inorganic oxide structure is provided, the details of which may be the same as set forth above.

In another example embodiment, a method of separating carbon dioxide may include bringing a gas mixture containing carbon dioxide into a contact with a carbon dioxide adsorbent that includes a mesoporous inorganic oxide having a crystalline halide of an alkali metal or alkaline earth metal supported thereto and a chemical species containing phosphorous, sulfur, or boron supported thereto.

Details for the carbon dioxide adsorbent may be the same as set forth above. In addition to carbon dioxide, the gas mixture may further include hydrogen, nitrogen, hydrocarbons (e.g., methane), or a combination thereof. The contact of the gas mixture with the carbon dioxide adsorbent may be conducted at a temperature of about 25° C. or higher, for example about 30° C. to 400° C. The carbon dioxide adsorbent as set forth above may exhibit a relatively high level of adsorption capacity not only at a relatively low temperature but also at a relatively high temperature such as about 190° C. to about 400° C.

The method of separating carbon dioxide may further include heat-treating the carbon dioxide adsorbent at a temperature of about 30° C. to about 700° C., optionally under reduced pressure, to desorb carbon dioxide and emit the same. The desorption pressure is not particularly limited, and it may be in a range of less than or equal to about 1000 Pa, and specifically about 700 Pa to about 50 Pa, for example, about 100 Pa.

The carbon dioxide adsorbent may be presented in the form of a carbon dioxide capture module. In an example embodiment, the carbon dioxide capture module may include an adsorption layer including the carbon dioxide adsorbent, a support plate holding the adsorption layer, and a housing including an inlet for an input gas stream and an outlet for the treated gas stream. Details for the carbon dioxide adsorbent may be the same as set forth above. The thickness of the adsorption layer is not particularly limited, but may be greater than or equal to about 0.2 cm, and specifically from about 0.5 cm to about 3 cm. The support plate may be made of any materials as long as it can support the adsorbent while allowing the flow of the input gas. Examples of the material may include quartz wool or the like. Materials and shapes of the housing for the module are not particularly limited, but may be selected as desired. By way of non-limiting examples, the housing may be made of stainless steel, copper pipe, or quartz pipe, and may have a shape of a cylinder, a prism, a square column, or the like.

The gas mixture containing carbon dioxide may be an input gas stream containing carbon dioxide. The gas mixture containing carbon dioxide may further include at least one gas selected from hydrogen, nitrogen, and methane. The composition of the input gas stream is not particularly limited, but may be appropriately selected as needed. For example, the gas mixture containing carbon dioxide may include carbon dioxide and nitrogen like a flue gas generated from a fossil fuel power plant. The input gas stream may include carbon dioxide and hydrogen like a flue gas generated from an integrated gasification combined cycle (IGCC) power plant. The input gas stream may include carbon dioxide and methane like a gas generated from a natural gas well. The flow rate of supplying the input gas stream is not particularly limited, but may be appropriately selected as desired. For example, the flow rate may be less than or equal to about 1000 ml/min, and specifically, less than or equal to about 500 ml/min.

As set forth above, the aforementioned adsorbent for carbon dioxide may adsorb carbon dioxide with a relatively high efficiency even at a relatively high temperature of 200° C. or higher. In addition, the mesoporous inorganic oxide structure included in the adsorbent is thermally stable so that even after 10 adsorption/desorption cycles either of adsorption at 200° C. and desorption at 200° C. under 1 bar or of adsorption at 200° C. and desorption at 400° C.-700° C. under 1 bar, the decrease in $CO_2$ adsorption capacity of the adsorbent is less than about 10%, for example less than about 8%, or less than about 5%.

The following examples illustrate one or more embodiments of the present disclosure in further detail. However, it should be understood that the following are merely examples and that this disclosure is not limited thereto.

EXAMPLES

Preparation of Carbon Dioxide Adsorbent and Characterization Thereof

Preparation Example 1

Preparation of Carbon Dioxide Adsorbent Including P—KCl/SBA-15 (I)

About 60 ml of hydrochloric acid (HCl, 35%) is added to about 380 ml of water to prepare an acidic aqueous solution (pH=about 1 to 2). 10 g of $(PEO)_{20}(PPO)_{70}(PEO)_{20}$ (wherein PEO is polyethylene oxide and PPO is polypropylene oxide) is added to the acidic aqueous solution as a surfactant to form micelles. To the resulting solution, 22 ml of tetraethyl orthosilicate is added to be hydrated, and then 14.6 g of KCl is added thereto. The resulting mixture is stirred at a temperature of 40° C. for about 2 hours to form a gel, and 13.6 g of $KH_2PO_4$ is added to the resulting gel and stirred for 2 hours. Then, the gel thus formed is aged at a temperature of 40° C. for 20 hours and at a temperature of 80° C. for about 20 hours, and dried at room temperature (about 25° C.) for three days. The dried gel containing $KH_2PO_4$ therein is calcined at 550° C. for 5 hours to obtain a carbon dioxide adsorbent including a mesoporous inorganic oxide with KCl and phosphorous (P) being supported thereto (hereinafter referred to as P—KCl/SBA-15).

Preparation Example 2

Preparation of Carbon Dioxide Adsorbent Including P—KCl/SBA-15 (II)

About 60 ml of hydrochloric acid (HCl, 35%) is added to about 380 ml of water to prepare an acidic aqueous solution (pH=about 1 to 2). 10 g of $(PEO)_{20}(PPO)_{70}(PEO)_{20}$ (wherein PEO is polyethylene oxide and PPO is polypropylene oxide) is added to the acidic aqueous solution as a surfactant to form micelles. To the resulting solution, 22 ml of tetraethyl orthosilicate is added to be hydrated, and then 14.6 g of KCl is added thereto. The resulting mixture is stirred at a temperature of 40° C. for about 2 hours to form a gel, which is then aged at a temperature of 40° C. for 20 hours and at a temperature of 80° C. for about 20 hours, and dried at room temperature (about 25° C.) for three days. The dried gel is calcined at 550° C. for 5 hours.

The calcined product is added to a $KH_2PO_4$ aqueous solution (prepared by dissolving 13.6 g of $KH_2PO_4$ in 250 ml of water) and impregnated with the same while stirring. Then, the resulting product is separated using a rotary evaporator and dried at room temperature (about 25° C.) for three days. The dried product is calcined again at 550° C. for 5 hours to obtain a carbon dioxide adsorbent including a mesoporous inorganic oxide with KCl and phosphorous (P) being supported thereto (P—KCl/SBA-15).

Preparation Example 3

Preparation of Carbon Dioxide Adsorbent Including P—KCl/SBA-15 (III)

A carbon dioxide adsorbent including a mesoporous inorganic oxide with KCl and phosphorous (P) being supported thereto (P—KCl/SBA-15) is prepared in the same manner as set forth in Preparation Example 2, except that the calcined product is added to a $KH_2PO_4$ aqueous solution and impregnated with the same while stirring, and is then subjected to a hydrothermal treatment at 120° C. for 20 hours before being separated.

Comparative Example 1

Preparation of Carbon Dioxide Adsorbent Including SBA-15

About 60 ml of hydrochloric acid (HCl, 35%) is added to about 380 ml of water to prepare an acidic aqueous solution (pH=about 1 to 2). 10 g of $(PEO)_{20}(PPO)_{70}(PEO)_{20}$ (wherein PEO is polyethylene oxide and PPO is polypropylene oxide) is added to the acidic aqueous solution as a surfactant to form micelles. To the resulting solution, 22 ml of tetraethyl orthosilicate is added to be hydrated and then is stirred at a temperature of 40° C. for about 2 hours to form a gel. The gel thus formed is aged at a temperature of 40° C. for 20 hours and at a temperature of 80° C. for about 20 hours, and dried at room temperature (about 24° C.) for three days. The dried gel is calcined at 550° C. for 5 hours to obtain a carbon dioxide adsorbent including a mesoporous inorganic oxide (SBA-15).

Comparative Example 2

Preparation of Carbon Dioxide Adsorbent Including P/SBA-15

A carbon dioxide adsorbent including a mesoporous inorganic oxide with phosphorous (P) being introduced thereto is prepared in the same manner as set forth in Preparation Example 1, except that KCl is not added thereto.

Comparative Example 3

Preparation of Carbon Dioxide Adsorbent Including P/SBA-15

About 60 ml of hydrochloric acid (HCl, 35%) is added to about 380 ml of water to prepare an acidic aqueous solution (pH=about 1 to 2). 10 g of $(PEO)_{20}(PPO)_{70}(PEO)_{20}$ (wherein PEO is polyethylene oxide and PPO is polypropylene oxide) is added to the acidic aqueous solution as a surfactant to form micelle complex. To the resulting solution, 22 ml of tetraethyl orthosilicate is added to be hydrated and then is stirred at a temperature of 40° C. for about 2 hours to form a gel. The gel thus formed is aged at a temperature of 40° C. for 20 hours and at a temperature of 80° C. for about 20 hours, and then is separated and dried at room temperature (about 24° C.) for three days. The dried gel is calcined at 550° C. for 5 hours.

The calcined product is added to a $KH_2PO_4$ aqueous solution (prepared by dissolving 13.6 g of $KH_2PO_4$ in 250 ml of water) and impregnated with the same while stirring, and then is subjected to a hydrothermal treatment at 120° C. for 20 hours. Then, the resulting product is separated and dried at room temperature (about 25° C.) for three days. The dried product is calcined again at 550° C. for 5 hours to obtain a carbon dioxide adsorbent including a mesoporous inorganic oxide with phosphorous (P) being introduced thereto.

Experimental Example 1

X-Ray Diffraction Analysis

Figure 2:
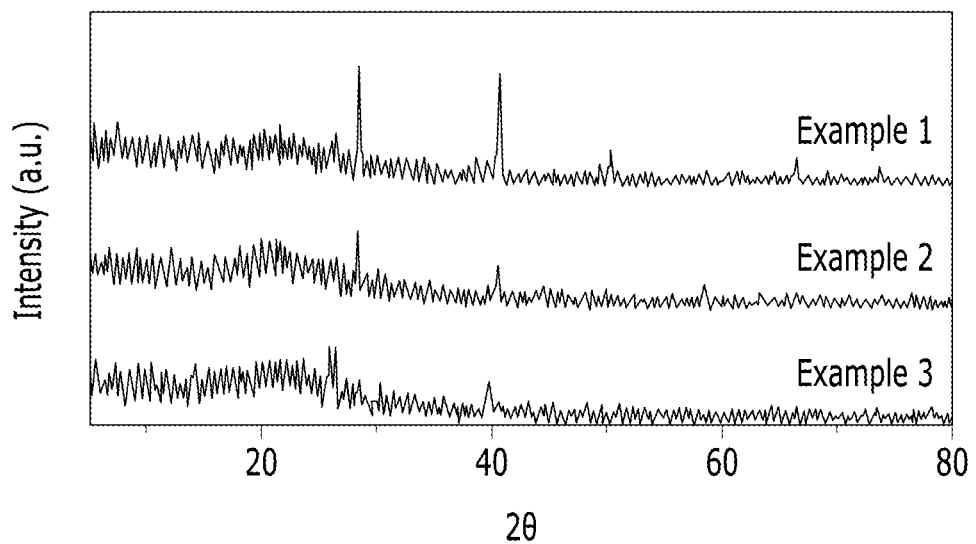
FIG. 2 shows X-ray diffraction spectrums of the carbon dioxide adsorbents prepared from Preparation Examples 1 to 3.

X-ray diffraction (XRD) analysis is performed for the carbon dioxide adsorbent prepared in Examples 1 to 3. The results are shown in FIG. 2. The X-ray diffraction analysis is performed with using a Cu Kα ray operated at 40 kV and 40 mA at a scan speed of 0.005° per second. FIG. 2 shows that XRD spectrum of the carbon dioxide adsorbent of Examples 1 to 3 includes a crystalline peak of KCl, which confirms that the crystalline potassium halide is supported to the mesoporous inorganic oxide.

Experimental Example 2

Measurement of Pore size and Pore Volume

An average pore size and a pore volume of the carbon dioxide adsorbent are measured for the carbon dioxide adsorbents of Examples 1 to 3 and Comparative Examples 1 to 3 via a nitrogen adsorption/desorption isothermal reaction using a Tristar 3000 instrument from Micrometrics Inc. The results are compiled in Table 1.

Experimental Example 3

Measurement of the Amount of Si, K, and P in the Carbon Dioxide Adsorbent 10 mg of each carbon dioxide adsorbent prepared in Examples 1 to 3 and Comparative Examples 1 to 3 is placed in a 50 ml polypropylene tube, respectively, and 1 ml of HF, 0.1 ml of nitric acid, and 5 ml of deionized water are added thereto to prepare a sample solution. 1 ml of each of the sample solutions is taken and put into a 15 ml polypropylene tube and diluted by 10 times with a 10% HCl solution and then concentrations of Si, K, and P are analyzed. Such a concentration analysis is made by using inductively coupled plasma atomic emission spectroscopy (ICP-AES; Shimadzu ICPS-8100 sequential spectrometer), and the results are compiled in Table 1.

TABLE 1

| Adsorbent | | Si ratio (wt %) | K ratio (wt %) | P ratio (wt %) | P/K ratio | Specific Surface Area ($m^2/g$) | Pore size (nm) | Pore volume ($cm^3/g$) |
|---|---|---|---|---|---|---|---|---|
| Preparation Example 1 | P—$KCl/SiO_2$—HT | 34.2 | 10.9 | 3.2 | 0.3 | 268.6 | 5.3 | 0.7 |
| Preparation Example 2 | P—$KCl/SiO_2$(Imp) | 16.8 | 1.7 | 18.0 | 10.6 | 109.0 | 3.2 | 0.5 |
| Preparation Example 3 | P—$KCl/SiO_2$—HT(Imp) | 25.1 | 2.0 | 10.8 | 5.4 | 35.3 | 1.7 | 0.4 |
| Comparative Example 1 | $SiO_2$ | 46.7 | — | — | — | 617.5 | 9.3 | 1.4 |
| Comparative Example 2 | $P/SiO2$—HT | 39.2 | — | 2.8 | — | 438.9 | 7.3 | 1.2 |
| Comparative Example 3 | $P/SiO_2$—HT(Imp) | 27.8 | — | 13.2 | — | 347.0 | 3.1 | 0.7 |

The results of Table 1 confirm that the carbon dioxide adsorbents of Examples 1 and 3 include a chemical species containing phosphorous and KCl being supported to a mesoporous inorganic oxide. In addition, the carbon dioxide adsorbents of Examples 1 and 3 have significantly reduced values in specific surface area, pore size, and pore volume as the chemical species containing phosphorous and KCl are supported to the mesoporous inorganic oxide.

Carbon Dioxide Adsorption Tests Using a $CO_2$ Adsorption Module Having a Carbon Dioxide Adsorbent Experimental Example 4

Evaluation of CO Adsorption $CO_2$ Adsorption Capacity Depending on the Types of Adsorbent $CO_2$ adsorption tests are performed for each of the carbon dioxide adsorbents of Preparation Examples 1 to 3, carbon dioxide adsorbents of Comparative Examples 1 to 3, and, as a commercially available carbon dioxide adsorbent, $Mg(OH)_2$ (Sigma-Aldrich, magnesium hydroxide) (Comparative Example 4), as well as a metal-organic composite framework (MOF) (BASF, Basolite C300) (Comparative Example 5). In the tests, the adsorbent is placed in a reactor column and $CO_2$ adsorption is carried out under the following conditions.

Gas mixture composition: 40% $CO_2$+60% $H_2$
Total flow rate: 200 mL/min
Weight of the adsorbent filled in the reactor: 0.25 g
Adsorption temperature: 200° C.

A percentage concentration of the adsorbed $CO_2$ is calculated from the area of the $CO_2$ concentration profile obtained from a gas analyzer. The percentage concentration of the adsorbed $CO_2$ is converted into a gram value, from which the $CO_2$ adsorption capacity may be calculated. The results are summarized in Table 2.

TABLE 2

| Sample | Adsorbent | CO2 adsorption capacity (unit: wt %) |
|---|---|---|
| Preparation Example 1 | P—KCl/SiO₂—HT | 35.2 |
| Preparation Example 2 | P—KCl/SiO₂(Imp) | 27.8 |
| Preparation Example 3 | P—KCl/SiO₂—HT(Imp) | 25.8 |
| Comparative Example 1 | SiO₂ | 15.1 |
| Comparative Example 2 | P/SiO₂—HT | 17.3 |
| Comparative Example 3 | P/SiO₂—HT(Imp) | 13.8 |
| Comparative Example 4 | MgOH adsorbent (Sigma-Aldrich) | 2.5 |
| Comparative Example 5 | MOF adsorbent (BASF) | 6.8 |

The results of Table 2 confirm that, even at a relatively high temperature of 200° C., the adsorbent of Preparation Examples 1 to 3 including the mesoporous silica with the chemical species containing phosphorous and the crystalline KCl supported thereto exhibit an adsorption capacity that is increased by 40% or more, and as much as 300% or higher in comparison with those of the adsorbents of Comparative Examples 1 to 3 and the commercially available adsorbents (i.e., MgOH and MOF).

Experimental Example 5

Crystal Analysis of the Adsorbent Prior to and After Adsorption

A carbon dioxide adsorption test is conducted for the adsorbent of Preparation Example 1. A crystal analysis for the adsorbent is performed prior to and after the adsorption, and the results are shown in FIG. 3.

Figure 3:
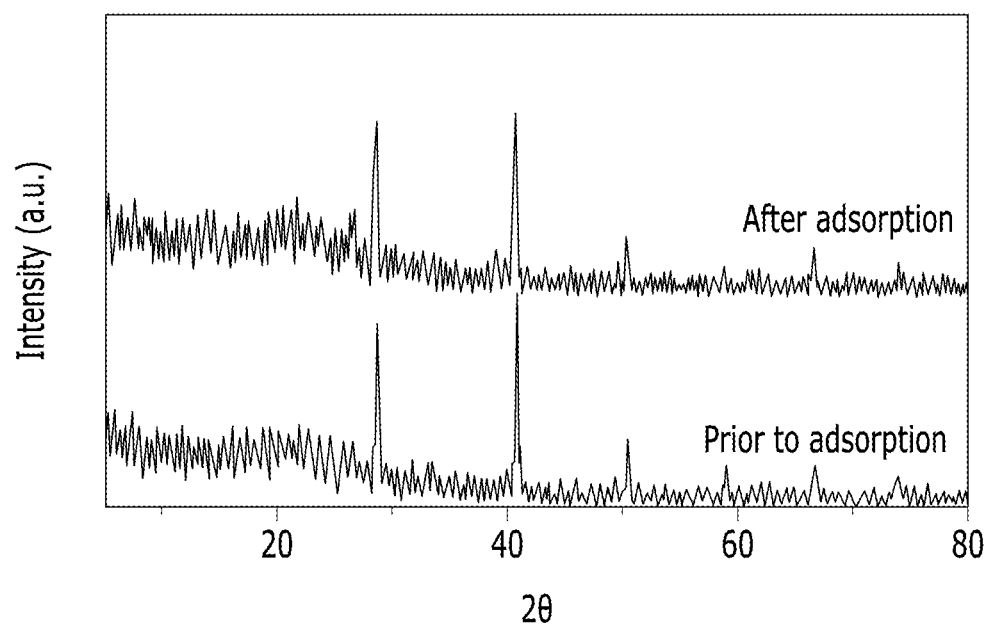
FIG. 3 shows X-ray diffraction spectrums of the carbon dioxide adsorbent of Preparation Example 1 before and after adsorption.

FIG. 3 confirms that the adsorbent shows substantially no change in the crystalline structure prior to and after the adsorption.

Experimental Example 6

Durability Test for the Carbon Dioxide Adsorbent I

Figure 4:
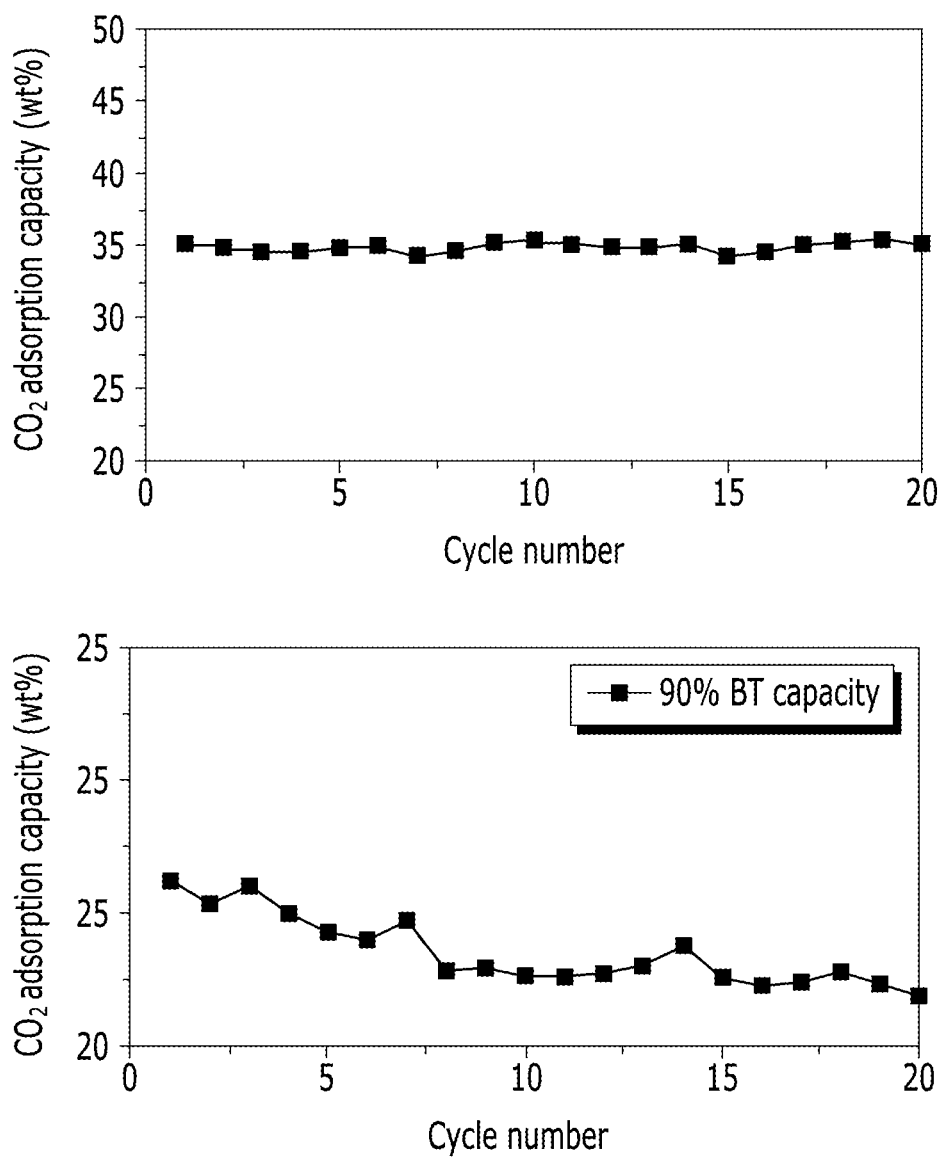
FIG. 4 is a view illustrating the results of adsorption/desorption cycle tests conducted in accordance with Experimental Example 6.

Adsorption/desorption cycle tests are conducted for the carbon dioxide adsorbent of Preparation Example 1 and the carbon dioxide adsorbent of Comparative Example 4 under the following conditions, and the results are shown in FIG. 4 (a) and FIG. 4 (b), respectively.

Composition of input gas stream: 40% $CO_2$+60% $H_2$
Total flow rate: 200 ml/min
Weight of the adsorbent as filled: 0.10 g
Adsorption temperature: 200° C.

FIG. 4 (a) confirms that the carbon dioxide adsorbent of Preparation Example 1 shows almost no change in the adsorption capacity up to 20 cycles. In contrast, FIG. 4 (b) confirms that the commercially available carbon dioxide adsorbent of Comparative Example 4 has a significantly lower level of adsorption capacity than that of the adsorbent of Preparation Example 1, and exhibits a decrease of greater than 70% in the adsorption capacity as 20 cycles proceed.

Experimental Example 7

Durability Test for the Carbon Dioxide Adsorbent II

Figure 5:
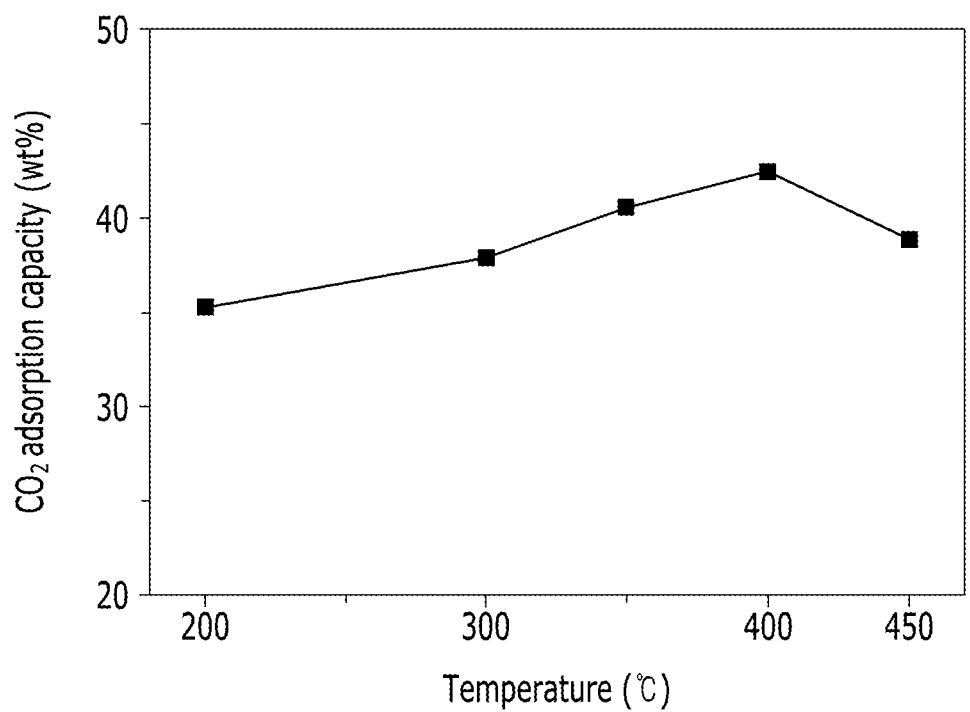
FIG. 5 is a view illustrating the results of adsorption tests conducted in accordance with Experimental Example 7.

Adsorption/desorption cycle tests are conducted for the carbon dioxide adsorbent of Preparation Example 1 under the following conditions (i.e., at different temperatures), and the results are shown in FIG. 5.

Composition of input gas stream: 40% $CO_2$+60% $H_2$
Total flow rate: 200 ml/min
Weight of the adsorbent as filled: 0.10 g
Adsorption temperature: 200° C. to 450° C.

FIG. 5 confirms that the carbon dioxide adsorbent of Preparation Example 1 has a relatively high adsorption capacity of 42.5% even at a relatively high temperature of equal to or greater than 400° C.

While this disclosure has been described in connection with various examples, it is to be understood that the present disclosure is not limited to the disclosed embodiments, but, on the contrary, is intended to cover various modifications and equivalent arrangements included within the spirit and scope of the appended claims.

What is claimed is:

1. An adsorbent for carbon dioxide, comprising:
a mesoporous inorganic oxide having a crystalline halide of an alkali metal or an alkaline earth metal supported thereto and a chemical species containing phosphorous (P), sulfur(S), or boron (B) supported thereto.

2. The adsorbent for carbon dioxide of claim 1, wherein the mesoporous inorganic oxide has an average pore diameter of about 1 nm to about 50 nm and a pore volume of about 0.1 $cm^3/g$ to about 1.5 $cm^3/g$.

3. The adsorbent for carbon dioxide of claim 1, wherein the mesoporous inorganic oxide comprises silica, alumina, titania, zirconia, a tin oxide, a cobalt oxide, a zinc oxide, an indium oxide, a nickel oxide, a hafnium oxide, a vanadium oxide, or a combination thereof.

4. The adsorbent for carbon dioxide of claim 1, wherein the mesoporous inorganic oxide is an amorphous material.

5. The adsorbent for carbon dioxide of claim 1, wherein the mesoporous inorganic oxide is a product of a synthesis that takes place in a presence of an acid compound and a self-assembled template.

6. The adsorbent for carbon dioxide of claim 1, wherein the crystalline halide of the alkali metal or the alkaline earth metal is selected from a lithium halide, a sodium halide, a potassium halide, a rubidium halide, a cesium halide, a magnesium halide, a calcium halide, a strontium halide, a barium halide, and a combination thereof.

7. The adsorbent for carbon dioxide of claim 1, wherein the chemical species containing phosphorous, sulfur, or boron is an oxide of phosphorous, an oxide of sulfur, an oxide of boron, a phosphate, a borate, a sulfate, or a combination thereof.

8. The adsorbent for carbon dioxide of claim 1, wherein the crystalline halide of the alkali metal or the alkaline earth metal is present in an amount of about 0.01 to 0.5 moles based on 1 mole of the mesoporous inorganic oxide, and the chemical species containing phosphorous, sulfur, or boron is present in an amount of about 0.01 to 2 moles based on 1 mole of the mesoporous inorganic oxide.

9. The adsorbent for carbon dioxide of claim 1, wherein a mole ratio between the crystalline halide of the alkali metal or the alkaline earth metal and the chemical species containing phosphorous, sulfur, or boron ranges from about 1:0.03 to about 1:20.

10. A method of preparing an adsorbent for carbon dioxide including a mesoporous inorganic oxide having a crystalline halide of an alkali metal or an alkaline earth metal supported thereto and a chemical species containing phosphorous, sulfur, or boron supported thereto, comprising:
obtaining an acidic aqueous solution including a surfactant;
contacting the acidic aqueous solution with an inorganic oxide precursor and a precursor of the crystalline halide of the alkali metal or the alkaline earth metal to form a gel and optionally aging the gel at a temperature of 30° C. or higher; and
performing a first process or a second process,
the first process including mixing the gel with a precursor of the chemical species containing phosphorous, sulfur, or boron to form a mixture, stirring the mixture, and optionally aging the mixture at a temperature of about 30° C. or higher to form a product, and separating, optionally drying, and calcining the product,
the second process including separating, optionally drying, and calcining the gel to form a calcined product, preparing an aqueous solution of a precursor of the chemical species containing phosphorous, sulfur, or boron, impregnating the calcined product with the aqueous solution of the precursor of the chemical species containing phosphorous, sulfur, or boron and optionally hydrothermally-treating the same, separating an impregnated and optionally hydrothermally-treated product to obtain a separated product, and recalcining the separated product.

11. The method of preparing an adsorbent for carbon dioxide of claim 10, wherein the obtaining an acidic aqueous solution includes dissolving at least one of an inorganic acid, an organic acid, and salts thereof in water.

12. The method of preparing an adsorbent for carbon dioxide of claim 10, wherein the obtaining an acidic aqueous solution includes the surfactant being an ionic surfactant, a non-ionic surfactant, and a combination thereof.

13. The method of preparing an adsorbent for carbon dioxide of claim 10, wherein the contacting the acidic aqueous solution includes the inorganic oxide precursor being selected from triethoxy silane, trimethoxy silane, tributoxy silane, titanium isopropoxide, titanium butoxide, titanium oxysulfate, titanium boride, titanium chloride, titanium nitride, tin butoxide, aluminum chloride, zinc chloride, indium chloride, zirconium chloride, nickel chloride, hafnium chloride, vanadium chloride, silicon carbide, silicon tetrachloride, silicon nitride, silicon tetraacetate, silicon tetrafluoride, silicon tetrabromide, silicon hexaboride, tetraallyl orthosilicate, tetramethyl orthosilicate, tetraethyl orthosilicate, tetrapropyl orthosilicate, and a combination thereof.

14. The method of preparing an adsorbent for carbon dioxide of claim 10, wherein the contacting the acidic aqueous solution includes the precursor of the crystalline halide of the alkali metal or the alkaline earth metal comprising at least one of Li, Na, K, Rb, Cs, Mg, Ca, St, and Ba, and being a halide, a hydroxide, a nitrate, an acetate, a hydrate thereof, or a combination thereof.

15. The method of preparing an adsorbent for carbon dioxide of claim 10, wherein the performing a first process or a second process includes the precursor of the chemical species containing phosphorous, sulfur, or boron being selected from $KH_2PO_4$, $K_2HPO_4$, $CaHPO_4$, $(NH_4)H_2PO_4$, $(NH_4)_2HPO_4$, $NaH_2PO_4$, $Na_2HPO_4$, $KH_2BO_3$, $K_2HBO_3$, $CaHBO_3$, $(NH_4)H_2BO_3$, $(NH_4)_2HBO_3$, $NaH_2BO_3$, $Na_2HBO_3$, $K_2SO_4$, $KHSO_4$, $CaSO_4$, $(NH_4)_2SO_4$, $(NH_4)HSO_4$, $Na_2SO_4$, $NaHSO_4$, $K_2S_2O_8$, $(NH_4)_2S_2O_8$, $Na_2S_2O_8$, and a combination thereof.

16. The method of preparing an adsorbent for carbon dioxide of claim 10, wherein the aging is carried out at least twice at different temperatures, the hydrothermally-treating is carried out under a pressure of about 0.1 to 10 bar at a temperature of about 80° C. to about 200° C., and the calcining or the recalcining is carried out in air at a temperature of about 400° C. to about 700° C.

17. A method of separating carbon dioxide, comprising:
contacting a gas mixture containing carbon dioxide with a carbon dioxide adsorbent, the carbon dioxide adsorbent including a mesoporous inorganic oxide having a crystalline halide of an alkali metal or an alkaline earth metal supported thereto and a chemical species containing phosphorous, sulfur, or boron supported thereto.

18. The method of separating carbon dioxide of claim 17, further comprising:
heat-treating the carbon dioxide adsorbent at a temperature of about 30° C. to about 500° C., optionally under a reduced pressure, to desorb the carbon dioxide.

19. The method of separating carbon dioxide of claim 17, wherein the contacting a gas mixture includes the crystalline halide of the alkali metal or the alkaline earth metal being selected from a lithium halide, a sodium halide, a potassium halide, a rubidium halide, a cesium halide, a magnesium halide, a calcium halide, a strontium halide, a barium halide, and a combination thereof.

20. The method of separating carbon dioxide of claim 17, wherein the contacting a gas mixture includes the chemical species containing phosphorous, sulfur, or boron being an oxide of phosphorous, an oxide of sulfur, an oxide of boron, a phosphate, a borate, a sulfate, or a combination thereof.

* * * * *